(12) United States Patent
Rub (10) Patent No.: US 8,854,751 B2
(45) Date of Patent: Oct. 7, 2014

(54) REDUCING ERRORS RESULTING FROM WIDTH VARIABILITY OF STORAGE MEDIA WRITE TRACKS

(75) Inventor: Bernardo Rub, Sudbury, MA (US)

(73) Assignee: Seagate Technology LLC, Cupertino, CA (US)

( * ) Notice: Subject to any disclaimer, the term of this patent is extended or adjusted under 35 U.S.C. 154(b) by 607 days.

(21) Appl. No.: 12/985,946

(22) Filed: Jan. 6, 2011

(65) Prior Publication Data
US 2012/0176698 A1   Jul. 12, 2012

(51) Int. Cl.
| | | |
|---|---|---|
| *G11B 27/36* | (2006.01) | |
| *G11B 5/02* | (2006.01) | |
| *G11B 5/012* | (2006.01) | |
| *G11B 19/04* | (2006.01) | |
| *G11B 20/18* | (2006.01) | |
| *G11B 20/10* | (2006.01) | |

(52) U.S. Cl.
CPC ........ *G11B 5/012* (2013.01); *G11B 2220/2516* (2013.01); *G11B 19/045* (2013.01); *G11B 20/1816* (2013.01); *G11B 2020/183* (2013.01); *G11B 20/1833* (2013.01); *G11B 20/10388* (2013.01); *G11B 20/1879* (2013.01)
USPC .............................................. 360/31; 360/55

(58) Field of Classification Search
None
See application file for complete search history.

(56) References Cited

U.S. PATENT DOCUMENTS

| | | | | |
|---|---|---|---|---|
| 5,940,237 A | * | 8/1999 | Takagi | 360/75 |
| 6,185,063 B1 | | 2/2001 | Cameron | |
| 6,437,947 B1 | * | 8/2002 | Uno | 360/78.04 |
| 7,394,607 B2 | | 7/2008 | Ohno et al. | |
| 7,423,828 B2 | * | 9/2008 | Emo et al. | 360/60 |
| 7,440,221 B2 | * | 10/2008 | Tsuchinaga et al. | 360/77.01 |
| 7,443,625 B2 | * | 10/2008 | Hamaguchi et al. | 360/55 |
| 7,486,460 B2 | * | 2/2009 | Tsuchinaga et al. | 360/48 |
| 7,969,832 B2 | * | 6/2011 | Raniuk et al. | 369/44.28 |
| 2005/0168861 A1 | | 8/2005 | Furuhashi | |
| 2006/0227449 A1 | | 10/2006 | Che et al. | |

* cited by examiner

*Primary Examiner* — K. Wong
(74) *Attorney, Agent, or Firm* — Hollingsworth Davis, LLC

(57) ABSTRACT

Various approaches that reduce the width variability of storage media data tracks are described. First and second data tracks are written so that the second track overlaps the first track. After writing the second track data to the second track, an effective width of the first track is determined. The effective width of the first track is the portion of the first track that is not overlapped by the second track. One or more additional write operations to the recording medium are performed to compensate for the effective width of the first track being less than a threshold. The additional write operations may include one or more of rewriting the first track data to a third track on the storage medium and writing additional redundancy information to supplement the coding of the first track data.

19 Claims, 13 Drawing Sheets

REDUCING ERRORS RESULTING FROM WIDTH VARIABILITY OF STORAGE MEDIA WRITE TRACKS

SUMMARY

Various embodiments described in this disclosure are generally directed to methods and devices for reducing the width variability of storage media data tracks. According to some methods, first track data is written to a first track on the recording medium. Second track data is written to a second track that overlaps the first track. An effective width of the first track is determined, where the effective width is the portion of the first track that is not overlapped by the second track. One or more additional write operations to the recording medium are performed to compensate for the effective width of the first track being less than a threshold. The additional write operations may include one or more of rewriting the first track data to a third track on the storage medium and/or writing additional redundancy information to supplement the coding of the first track data.

Some methods involve writing data to a recording medium that includes writing first track data to a first write track and writing second track data to a second track that overlaps the first track. The second track data is written using an adjusted pitch limit.

A storage device includes a storage medium and a control unit that controls the writing of multiple data overlapping tracks to the recording medium. The control unit is configured to respond to an effective width of the first track being less than a threshold. The effective width is a portion of the first track that is not overlapped by the second track. For example, the control unit may cause data previously written to a first track to be rewritten to a third track. Additionally or alternatively, the control unit may cause redundancy information related to the data previously written to the first track to be written to a third track.

These and other features can be understood in view of the following detailed discussion and the accompanying drawings.

DETAILED DESCRIPTION

Shingled recording can be used to increase the amount of storage capacity of a storage medium. In this approach, data is written to a storage medium in overlapping tracks. When a second track overlaps a first track, the effective width of the first track, i.e., the width of the track available to be read, is reduced by the amount of the overlap. Positioning variability of overlapping tracks can be a source of signal to noise ratio (SNR) variability and a factor in the unrecoverable error rate (UER) of a storage device. The UER of a storage device may be specified taking into account "worst case" situations so that even unlikely combinations of events that affect the UER are relevant, such as narrow effective widths caused by overlapping tracks. When shingled recording is used, e.g., shingled magnetic recording, servo variability may have an increasing impact on SNR variability. The SNR variability is correlated to the effective written width variability and as a result, the UER is correlated to the ability to recover data blocks with the narrowest effective written widths.

Embodiments described in this disclosure are useful to mitigate the effects of width variability on the UER leading to SNR gains. The approaches discussed herein involve using the position information from a first data track and a second data track that overlaps the first data track to determine the effective written width of the first data track. If the effective width of the first data track is less than a threshold value, then some action is taken to mitigate the potential decrease in the SNR of the first data track due to its narrow effective written width.

Figure 1:
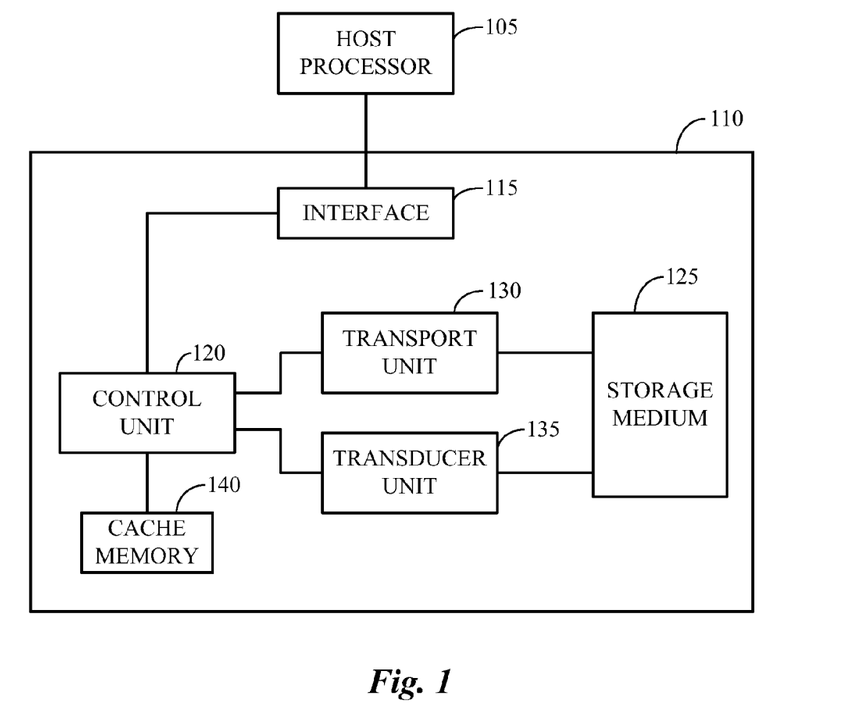
FIG. 1 is a block diagram of a system incorporating a storage device suitable for implementing the approaches described in this disclosure to increase the signal-to-noise ratio of data written to the storage medium in overlapping tracks.

FIG. 1 is a block diagram of a system incorporating a storage device suitable for implementing the approaches described in this disclosure to increase the SNR of data written to the storage medium in overlapping tracks. The system 100 includes a host computer 105 connected to a storage device 110. The storage device 110 may include a magnetic disk drive, a magnetic tape drive, an optical drive, and/or any other type of storage device 110. The storage device 110 is coupled to the host processor 105 through an interface 115. The storage device 110 includes a control unit 120 that controls the read and write operations of the storage medium 125.

For example, read and write operations of the storage medium 125 controlled by the control unit 120 may be responsive to read or write operation requests from the host processor 105.

The control unit 120 is coupled to the transport unit 130 which is configured to position the storage medium 125 for access. For example, if the storage medium 125 is a magnetic tape, the transport unit 130 may cause relative motion between the magnetic tape and the transducer that reads or writes the data on the tape. If the storage medium is a disk, the transport unit 130 may produce relative rotational motion between the disk and the transducer the reads or writes the data on the disk. In the case of a disk drive storage device, the transport unit may include a motor controller coupled to a spindle motor that is configured to rotate the storage medium, e.g., one or more disks.

The control unit 120 is also coupled to a transducer unit 135 and is configured to control the timing and positioning of transducers of the transducer unit that read or write data to the storage medium. The transducers that write data to the storage medium are referred to as write heads and the transducers that read data from the storage medium are referred to as read heads. For shingled recording, e.g., shingled magnetic recording, of overlapping tracks, the control unit determines an offset from preceding track location and generates signals that cause the transducer unit to move the write head to the offset location, for example.

The control unit 120 is also coupled to a cache memory 140 used to temporarily store data written to and/or read from the storage medium 130 and/or parameters used for writing or reading data to or from the storage medium 130. For example, as discussed in more detail below, the cache 140 may store data previously written to data tracks and/or may store write operation parameters such as the position of one or more previously written tracks and/or previous track widths and/or other information.

Figure 2:
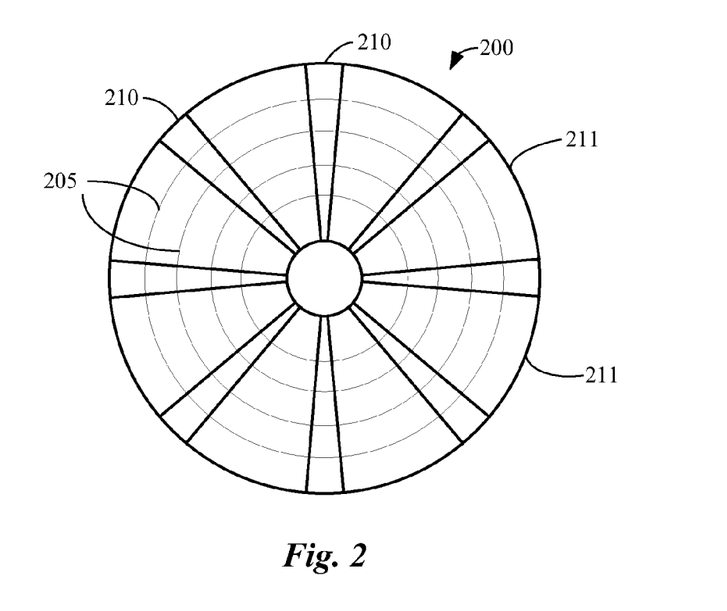
FIG. 2 illustrates a rotatable disk which may serve as a storage medium.

FIG. 2 illustrates a rotatable disk 200 which may serve as storage medium 125 illustrated in the block diagram of FIG. 1. Data is written to the rotatable disk 200 along circular, concentric data tracks 205 of the disk 200. The concentric data tracks 205 include a servo portion 210 and a data portion 211. The servo portion 210 stores servo address information and servo burst information. The servo address information is used for moving the read or write head to the desired track for reading or writing data. The servo burst information is used for positioning the read or write head on the desired track. The data portion 211 stores the data written to or read from the disk 200.

Figure 3A:
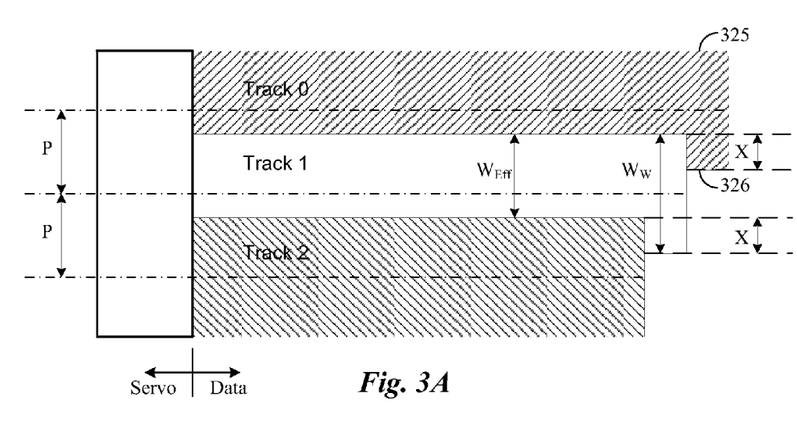
FIGS. 3A-3B illustrate tracks written to the storage medium using a shingled write process.

FIG. 3A depicts data Tracks 0 through 2 of a storage medium which may correspond to the concentric tracks 205 of FIG. 2. Although for convenience of illustration, the data tracks of FIG. 3A are shown as substantially linear tracks, the data tracks may or may not be linear and may correspond to portions of the concentric tracks 205 of the disk illustrated in FIG. 2, for example. As previously discussed, the data tracks include a data portion where the data is stored and a servo portion that includes servo positioning information. FIG. 3A shows tracks 0 through 2 written by shingled recording, such as shingled magnetic recording. Each track includes an upstream edge 325 and a downstream edge 326. In this approach, the control unit calculates the position for each track that includes an offset amount, X, from the position of the preceding track and sends control signals to the transducer unit to move the write head to the calculated position to perform a data write. The nominal center-to-center pitch, P, of the Tracks 0-2 is constant in this idealized depiction because each track is offset from the previous track by the offset amount, X. The nominal pitch of the storage medium is P, which is the center to center spacing of the tracks based on the offset amount, X. The width of each track as it is written is nominally $W_W$. Due to the overlapping of the tracks in shingled recording, the effective width of the Track 1, $W_{Eff}$, is the written width of Track 1 reduced by the amount that Track 2 overlaps Track 1, which in this illustration is the offset amount, X. The effective width of the written track is the width of the track that is available for reading the information stored in the track. If this width becomes too narrow, errors will occur and the UER of the data storage device will be undesirably increased.

As data is written to the overlapping tracks, the actual position of a written track may differ from the target position by an amount, $\Delta$. For example, if the calculated offset position for a track is X, then the actual offset position may be X±$\Delta$. The controller can use the servo position information to determine the actual position of the track. In shingled recording, the difference between the target position based on the calculated offset, X, and the difference amount, $\Delta$, may lead to encroachment of the effective write width, $W_{Eff}$.

Figure 3B:
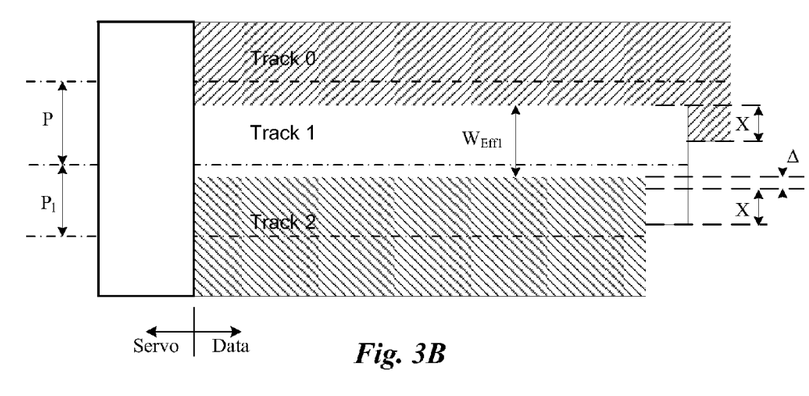

FIG. 3B shows a data tracks 0 through 2, where Track 1 overlaps Track 0 and Track 2 overlaps Track 1. After the Track 0 is written, a target position for Track 1 is determined based on the offset X and Track 1 is written. After Track 1 is written, a target position for Track 2 is determined based on the offset X. However, in this case, the actual position of Track 2 differs from the target position by an amount $\Delta$. The actual position includes the target offset, X, and the difference amount, $\Delta$. The difference amount, $\Delta$, reduces the effective write width of Track 1, $W_{Eff1}$ when compared to the nominal effective width $W_{Eff}$ illustrated in FIG. 3A. The pitch, $P_1$, between the Track 1 and Track 2 is reduced from the nominal pitch, P, by the difference amount, $\Delta$. Due to the difference amount, $\Delta$, that controls the actual position of a write track, it is possible for effective track widths to become very narrow.

In some implementations, to prevent unacceptably narrow effective write widths, the control unit terminates write operations of tracks if the track pitch varies by more than a limit amount from the nominal pitch. For example, referring to FIG. 3B, the control unit may compare the pitch, $P_1$, between Track 1 and Track 2 to a limit, referred to herein as OCLim (On Cylinder Limit). In some cases, OCLim may be set to about 16% of the nominal track pitch, P. If the pitch is less than OCLim, then the track is not written. For example, in the example illustrated in FIG. 3B, if the pitch, $P_1$, between Tracks 1 and 2 would be less than 0.16 P, then Track 2 is not written.

To reduce the UER due to narrow effective write widths, certain approaches described herein may be used as alternatives or in addition to terminating write operations if the track pitch is less than a pitch limit. Some approaches described in this disclosure are based on a computation of the effective written width of a previously written track (first track) after writing a subsequently written track (second track) that overlaps the first track. Calculation of the effective write width of the first track is based on the actual position of the first written track and the actual position of the second written track, both of which can be determined using servo position information and stored by the control unit. These approaches differ from terminating the write operation based on the pitch limit, OCLim, described above, because instead of terminating the writing of the second track based on the pitch limit, approaches herein perform one or more additional write operations associated with the first track based on the effective width of the first track.

In some cases, the control unit causes position information, e.g., of the first and second tracks discussed above, and/or data previously written to tracks to be stored in the cache memory. The control unit uses the position information of the previously written track (first track) and the position information of the subsequently written track (second track) to compute the effective width of the previously written track (first track). Further write operations to the storage medium are modified in response to the effective width of the previously written track. For example, in some cases, if the effective width of the first track is less than a primary threshold, the data written to the first track is queued for re-writing to another location, a third track. In some cases, if the effective width of the first track is less than a secondary threshold, additional redundancy information is written for the data stored in the first track. For example, in some cases, the primary threshold may be about 0.87 of the nominal pitch, and the second threshold may be about 0.97 of the nominal pitch.

Figure 4A:
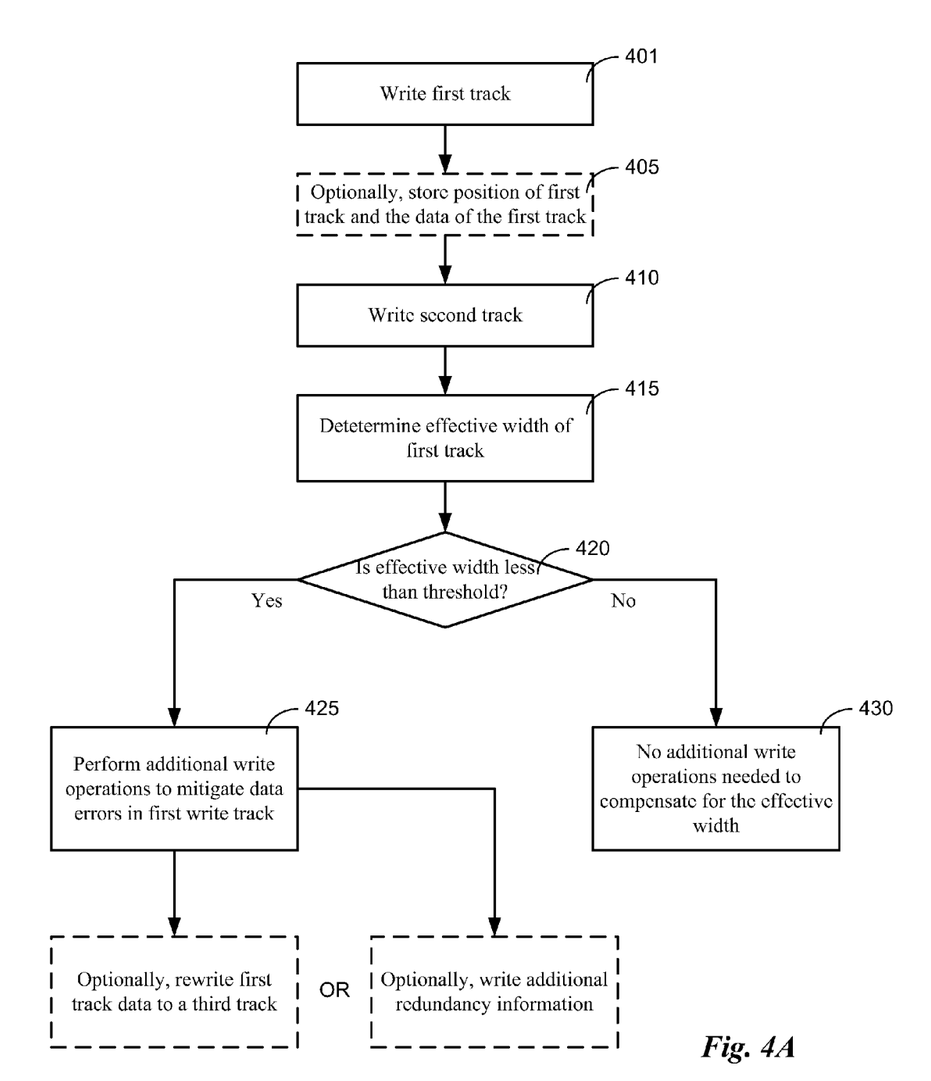
FIG. 4A is a flow diagram illustrating a method of performing additional write operations in response to an effective width of a first written track being less than a first threshold.
Figure 4B:
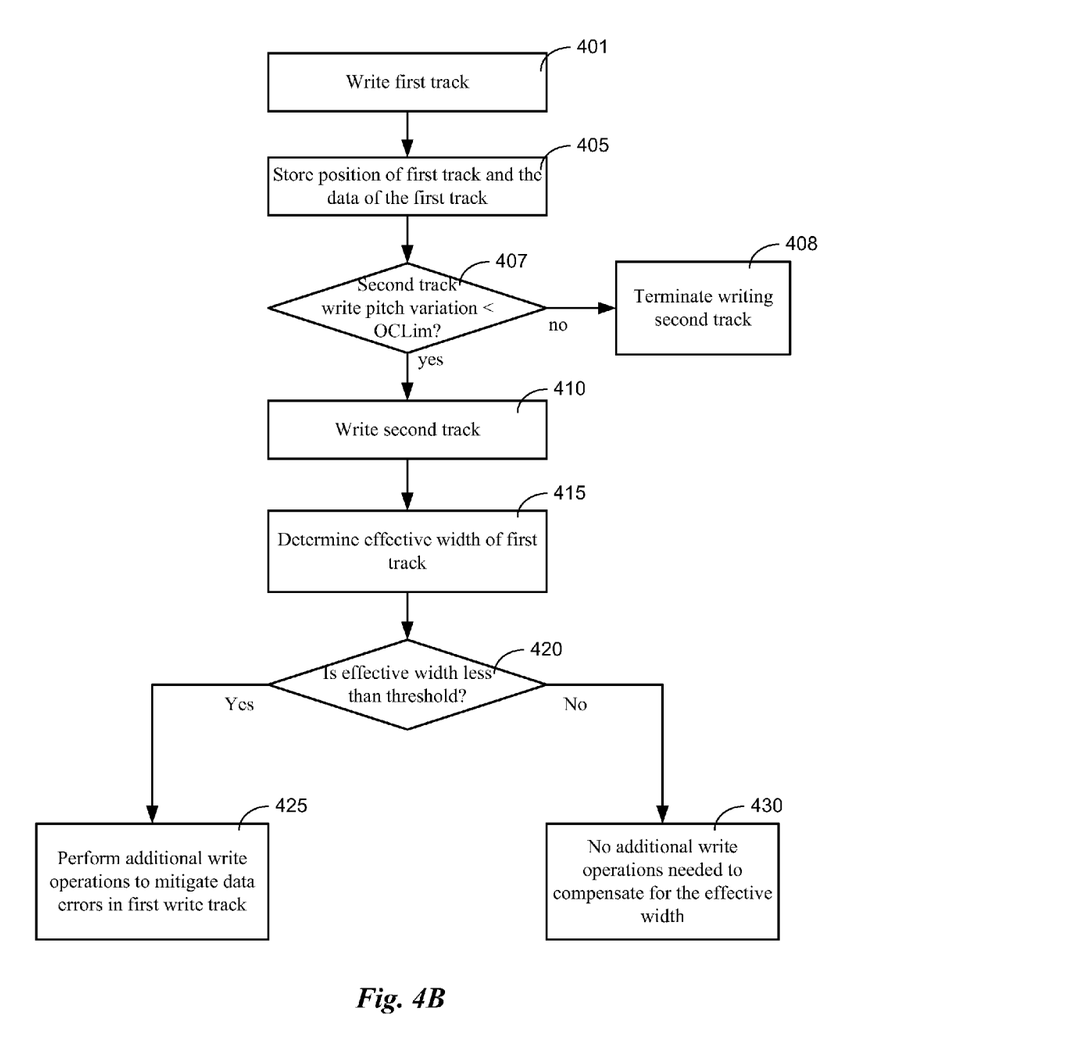
FIG. 4B illustrates a method of performing additional write operations in response to an effective width of a first written track being less than a first threshold and also including the use of a pitch limit.

The storage device of FIG. 1 may be configured to implement the method of FIGS. 4A-4B. FIG. 4A is a flow diagram illustrating a method of performing additional write operations in response to an effective width of a first written track being less than a threshold. The additional write operations compensate for a narrow effective width of the first track to avoid data errors. A first track is written 401 to the storage medium. The actual position of the first track and the data stored in the first track are stored 405 in cache. The control unit calculates an offset from the first track as a target position for a second track. The second track is written 410 and overlaps the first track. The effective width of the first track (the previously written track) is determined 415 based on the actual position of the first track and the actual position of the second written track (the subsequently written track). The effective width is the difference between the actual position of the first track and the actual position of the second track. If the effective width is greater than 420 a threshold, then no additional write operations are needed 430 to compensate for the effective width of the first track. However, if the effective width of the first track is less than 420 the threshold, then one or more additional write operations may be performed 425 to compensate for the narrow effective width. The one or more additional write operations cause information to be written to the storage medium that will reduce and/or correct for errors in the data stored in the first track. For example, the one or more additional write operations may involve rewriting the data previously written to the first track to another location, such as a third track. As another example, the one or more additional write operations may additionally or alternatively involve writing additional redundancy information associated with the data written to the first track to a third track.

The flow diagram of FIG. 4B illustrates a method that is similar in some respects to the method of FIG. 4A except that the method of FIG. 4B includes the use of a pitch limit. As before, the first track is written 401 to the storage medium. The data written to the first track and the actual position of the first track are stored 405. Before the second track is written to overlap the first track, the process checks to determine if the pitch between the first and second tracks is less than a pitch limit, OCLim. If the pitch between the first and second tracks is less than 407 OCLim, writing of the second track is terminated 408.

However, if the pitch between the first and second tracks is greater than 407 OCLim, then the second track is written 410 and the effective width of the first track is determined 415 as previously described. If the effective width is greater than 420 a threshold, no additional write operations are needed 430 to compensate for the effective write width. However, if the effective width is less than 420 the threshold, then at least one additional write operation is performed 425 to compensate for the narrow effective width.

In some cases, the action taken to compensate for the narrow effective width includes queuing the data previously written to the first track (and stored in the cache) to be re-written at a different location on the storage medium, e.g., a third track. In some cases, the action taken to compensate for the narrow effective width includes supplementing the data written to the first track with additional redundancy information to assist in overcoming errors due to the narrow effective width of the first track. In some cases, the redundancy information is written to a third track. These approaches may be used together, as illustrated in FIG. 5 and/or may be used along with the pitch limit as discussed in connection with FIG. 4B.

Figure 5A:
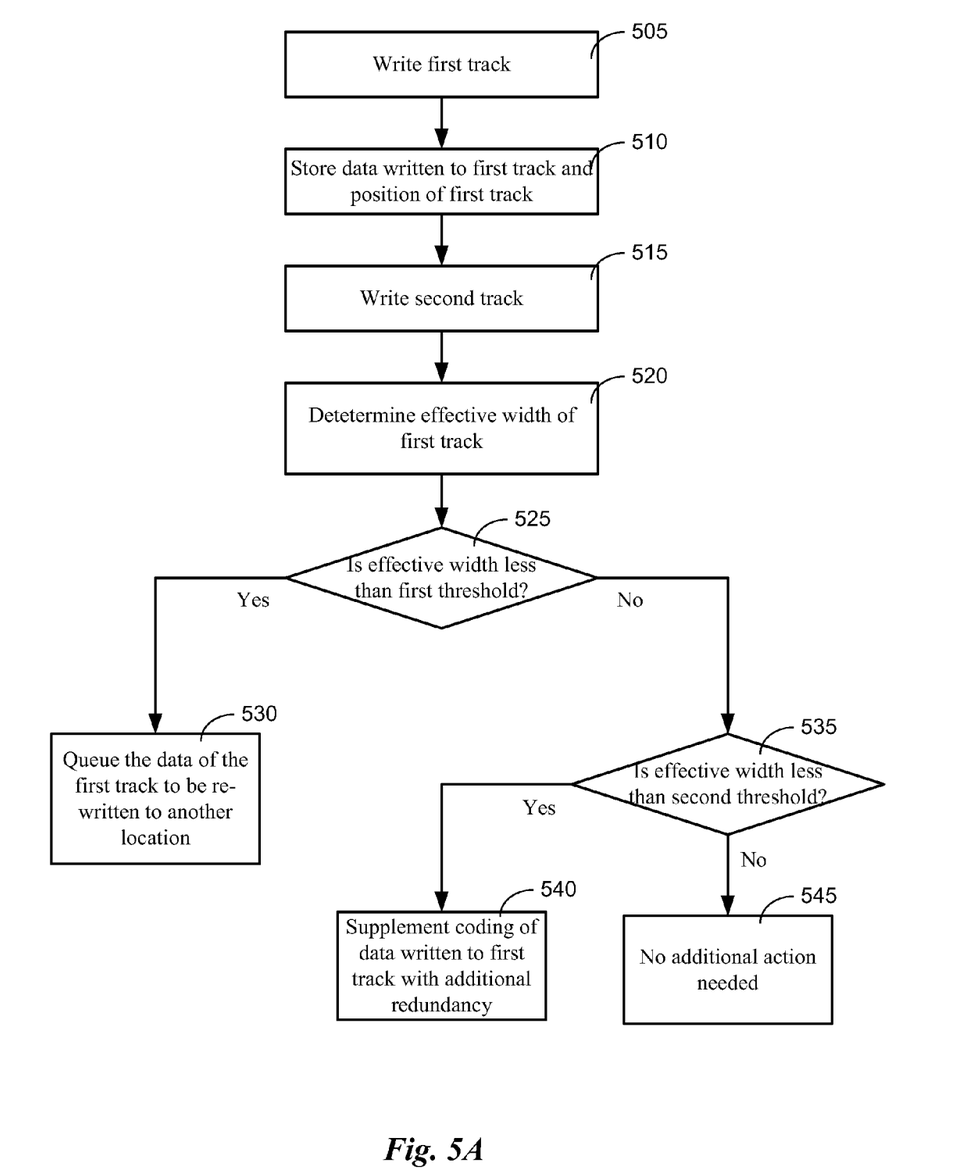
FIG. 5A illustrates the use of a first threshold and a second threshold to perform additional write operations that compensate for a narrow effective width.

The storage device illustrated in FIG. 1 may be configured to implement the methods of FIGS. 5A-5D. FIG. 5A illustrates the use of a primary threshold and a secondary threshold to perform additional write operations that compensate for a narrow effective width. The process writes 505 the first track to the storage medium. The actual position of the first track and the data written to the first track is stored 510 in the cache. The second track overlapping the first track is written 515 to the storage medium. After writing the second track, the effective width of the first track is calculated 520. As previously discussed, determining the effective width of the first track takes into account the actual position of the second track and the actual position of the first track.

If the effective width is less than 525 a primary threshold, the data written to the first track is queued 530 to be re-written at another location, e.g., a third track. If the effective width of the first track is greater than 525 the primary threshold but less than 535 a secondary threshold, supplemental redundancy information associated with the first track data is written 540 to the storage medium to supplement the coding of the data stored in the first track. If the effective width of the first track is greater than 535 both the primary and the secondary thresholds, no additional write operations are required 545.

Figures 5B, 5C:
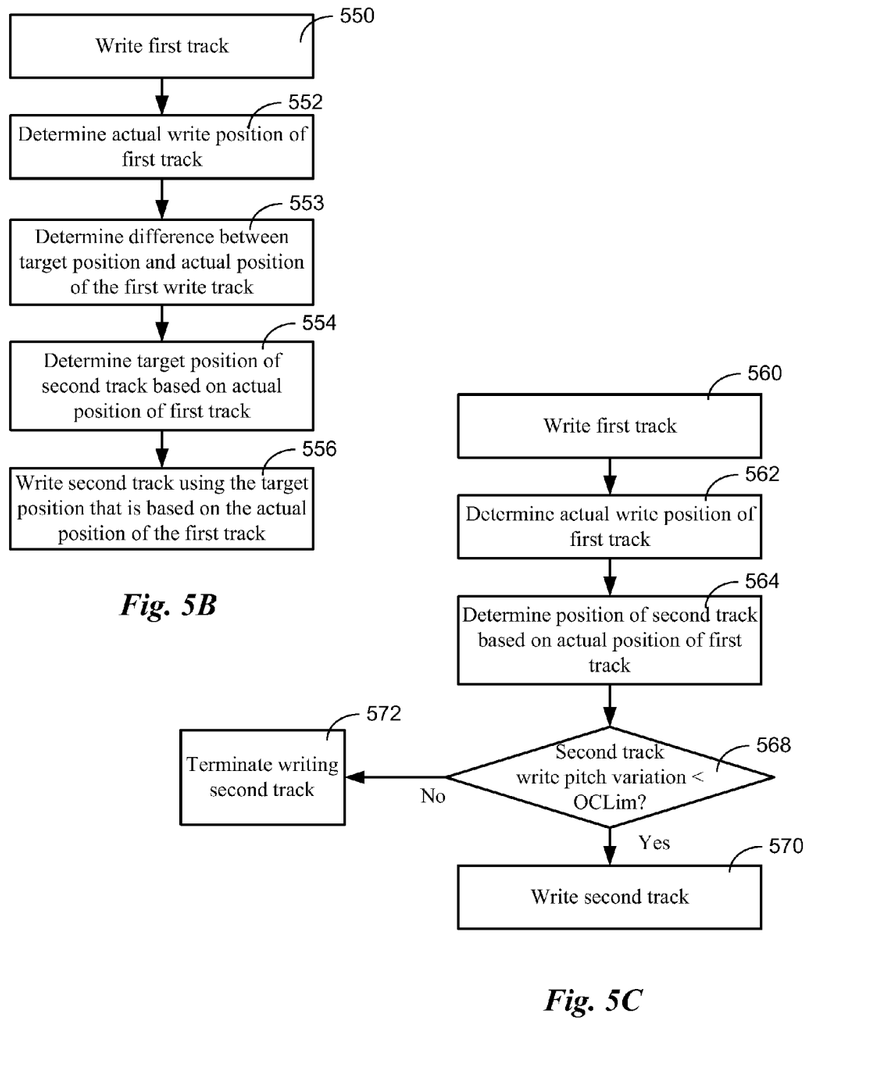
FIG. 5B is a flow diagram that illustrates determining the target position of the second track based on the actual write position of the first track.
FIG. 5C illustrates adjusting the second track position based on the actual position of the first track used in conjunction with a pitch limit.

In some implementations, the target position of the second track is adjusted based on the actual write position of the first track. According to one method, a first track is written 550 and the actual write position of the first track is determined 552. The difference between the target position of the first track and the actual position of the first write track is determined 553. The target position of the second track is determined 554 based on the difference between the target position of the first track and the actual position of the first track. Thus, according to this method, the target position of the second track is based on the actual position of the first track rather than an offset from the target position of the first track. The second track is written 556 to the second track target position.

In some cases, the storage device may implement adjustment of the second track position using the first track position in conjunction with a pitch limit, as illustrated in FIG. 5C. For example, if the first track is written with little variability then the target position for the second track can be closer to the first. This change in the distance between tracks as a function of how the first track was written results in a density gain since track can be packed more closely. After the first track is written 560, the actual position of the first track is determined 562. The target position of the second track is determined 564 based on the actual position of the first track. The process checks to determine if the pitch variation for the second track position is less than 568 the OCLim. If so, the second track is written 570. However, if the pitch variation of the second track position is greater than the OCLim, then writing of the second track is terminated 572.

Figure 5D:
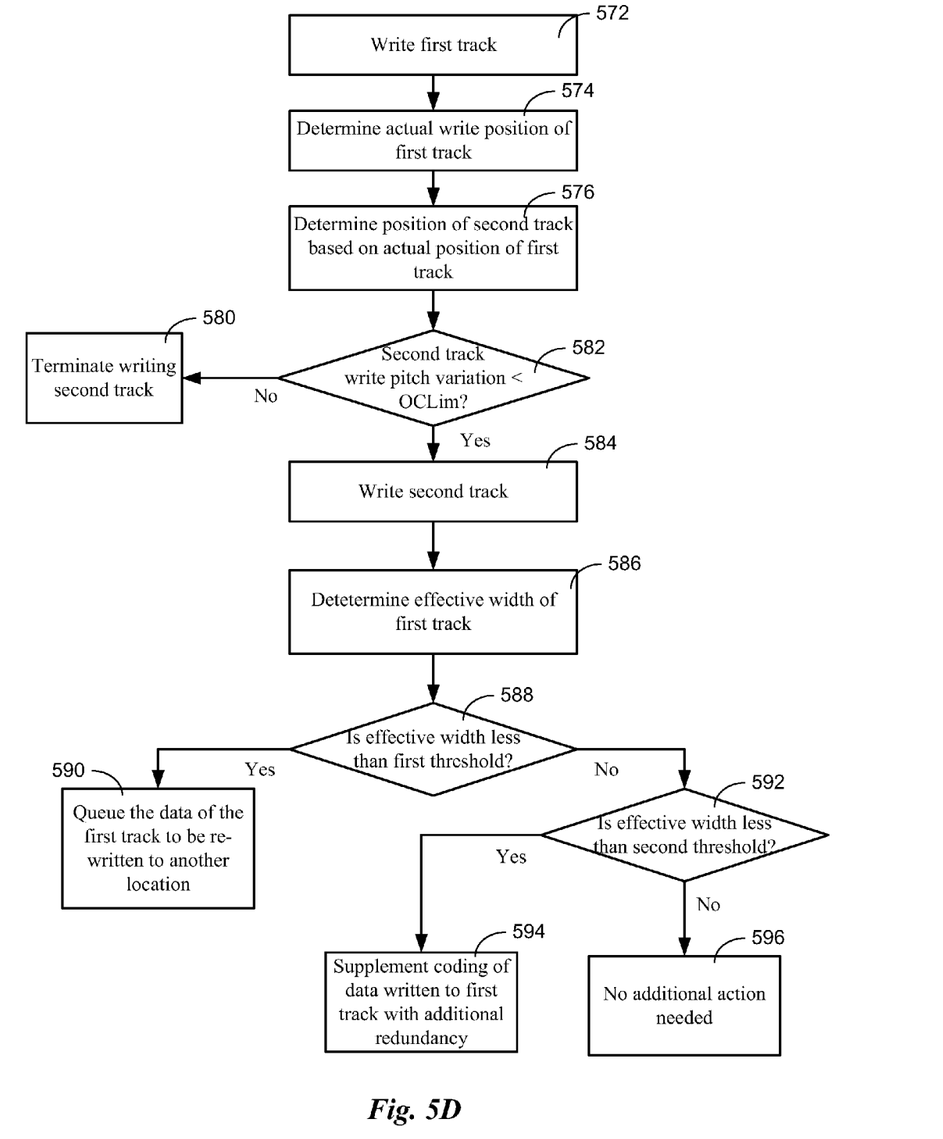
FIG. 5D illustrates a method of adjusting the second track position based on the actual position of the first track used in conjunction with a pitch limit and additional write operations that may be performed in response to an effective width of a first written track being less than a threshold.

The process illustrated in FIG. 5D is similar in some respects to the process illustrated in 5C except that, additional write operations may be performed in response to an effective width of a first written track being less than a threshold. After the first track is written 572, the actual position of the first track is determined 574. The target position of the second track is determined 576 based on the actual position of the first track. The process checks to determine if the pitch variation for the second track position is less than 582 the OCLim. If so, the second track is written 584. However, if the pitch variation of the second track position is greater than 582 the OCLim, then writing of the second track is terminated 580.

After writing the second track, the effective width of the first track is calculated 586. As previously discussed, determining the effective width of the first track takes into account the actual position of the second track and the actual position of the first track. If the effective width is less than 588 a primary threshold, the data written to the first track is queued 590 to be re-written at another location, e.g., a third track. If the effective width of the first track is greater than 588 the primary threshold but less than 592 a secondary threshold, supplemental redundancy information associated with the first track data is written 594 to the storage medium to supplement the coding of the data stored in the first track. If the effective width of the first track is greater than 592 both the primary and the secondary thresholds, no additional write operations are required 596.

Some embodiments reduce the variability of the written width of the shingled tracks by adjusting the pitch limit (OCLim) based on the actual written position of the previous track. Variability in the position of written tracks is illustrated with reference to FIG. 6A. In this example, Track 0 is written first, followed by Track 1, followed by Track 2. Tracks 0, 1, and 2 are targeted to be written at a pitch, P, offset, X, and a target effective width, $W_{eff}$. However, when Track 1 written, the position of Track 1 varies from its target position by a difference amount, $\Delta_1$. Although $\Delta_1$ modifies the Track 1 from its target position, the difference amount, $\Delta_1$, is not beyond the initial OCLim. If the different amount $\Delta_1$ is beyond the OCLim, then the Track 1 would not be written.

To reduce the variability of the effective track width, OCLim may be adjusted track by track. For example, the initial OCLim (used for writing Track 1) may be adjusted for the next track written, Track 2 in this example. The adjusted OCLim takes into account the actual position of Track 1 and modifies the initial OCLim accordingly. For example, if the actual position of Track 1 varies from the target position in the positive direction, then the initial OCLim could be increased for the next track written (Track 2). However, if the actual position of Track 1 varies from the target position in the negative direction, then the initial OCLim would be decreased for Track 2. In some cases, the adjustment of OCLim is one-sided. In one example, if the actual position of Track 1 varies from the target position in the positive direction as illustrated by the direction arrows in FIG. 6A, then OCLim for Track 2 would remain the same and if the actual position of Track 1 varies from the target position in the negative direction, then the initial OCLim would be decreased for Track 2. Thus, Track 2 would need to meet a more stringent pitch limit if the variation of the previously written track from its target position has the potential to cause a decrease in the actual $W_{eff}$.

Figure 6A:
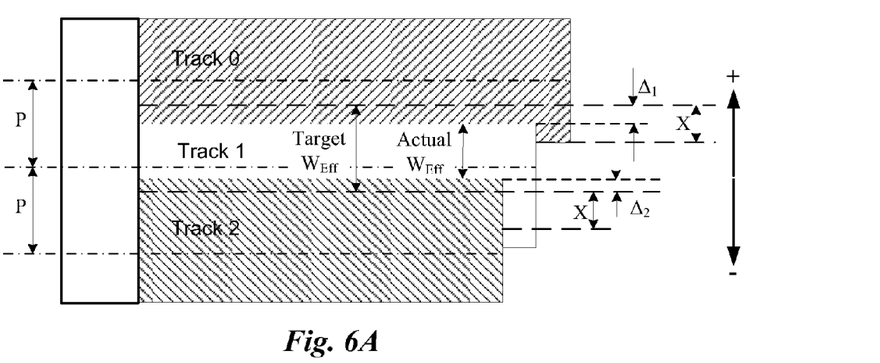
FIG. 6A illustrates tracks written to the storage medium using a shingled write process.

In another example, if the actual position of Track 1 varies from the target position in the negative direction as illustrated by the direction arrows in FIG. 6A, then OCLim for Track 2 would remain the same and if the actual position of Track 1 varies from the target position in the positive direction, then the initial OCLim would be increased for Track 2. IN this example, Track 2 would need to meet a less stringent pitch limit if the variation of the previously written track. As indicated in FIG. 6A, Track 2 may vary from its target position by difference amount, $\Delta_2$ which must not exceed the adjusted OCLim.

Adjustment of OCLim for each track may be expressed:

$OCLim_{adj} = OCLim_{prev} + \alpha$, where $OCLim_{prev}$ is the OCLim used when writing the previously written track, and a is a function of the actual position of the previously written track.

Figure 6B:
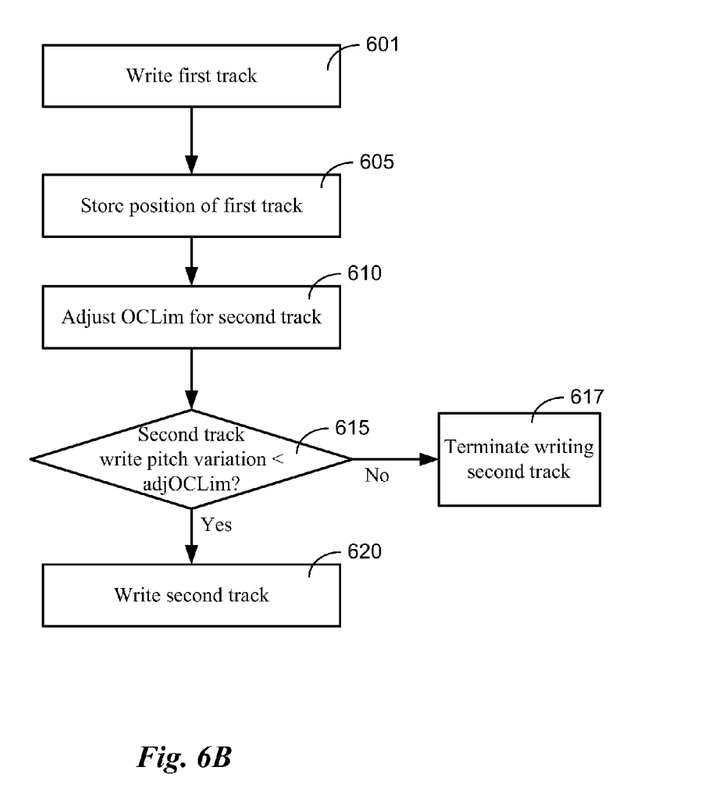
FIG. 6B is a flow diagram illustrating a process of modifying the pitch limit of a second write track based on the position of a first write track.

The control unit illustrated in FIG. 1 may be configured to implement the method of FIG. 6B. FIG. 6B is a flow diagram illustrating write operations that include adjustment of OCLim. After a first track is written 601, the actual position of the first track is stored 605. The OCLim for the second track is adjusted 610 based on the actual position of the first track. If the pitch variation for the second track is less than 615 the adjusted OCLim, then the second track is written 620. However, if the pitch variation for the second track is greater than 615 the adjusted OCLim, then the second track is not written 617.

Figure 6C:
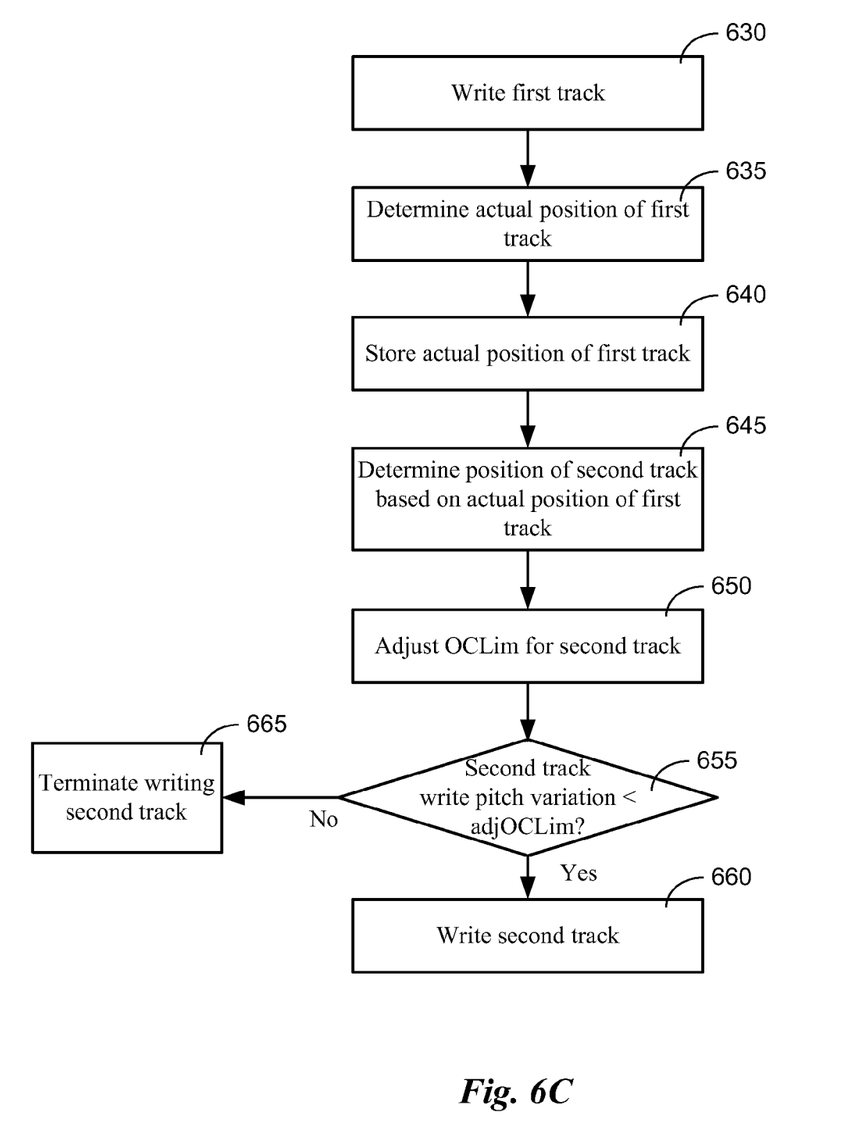
FIG. 6C is a flow diagram illustrating determination of the second track position based on the actual position of the first track used in conjunction with adjusting the pitch limit for the second.

In some cases, determination of the second track position based on the actual position of the first track may be used in conjunction with adjusting the OCLim for the second track as illustrated by the flow diagram in FIG. 6C. After the first track is written 630, the actual position of the first track is determined 635 and stored 640. The position of the second track is determined 645 based on the actual position of the first track. OCLim is adjusted 650 for the second track based on the actual position of the first track. If the pitch variation for the second track is less than 655 the adjusted OCLim, then the second track is written 660. However, if the pitch variation for the second track is greater than 615 the adjusted OCLim, then the second track is not written 665. The track-by-track adjustment of OCLim may be used alone or in combination with performing additional write operations based on effective track width, e.g., as discussed in connection with FIGS. 4A, 4B, 5A-5D.

Figure 7:
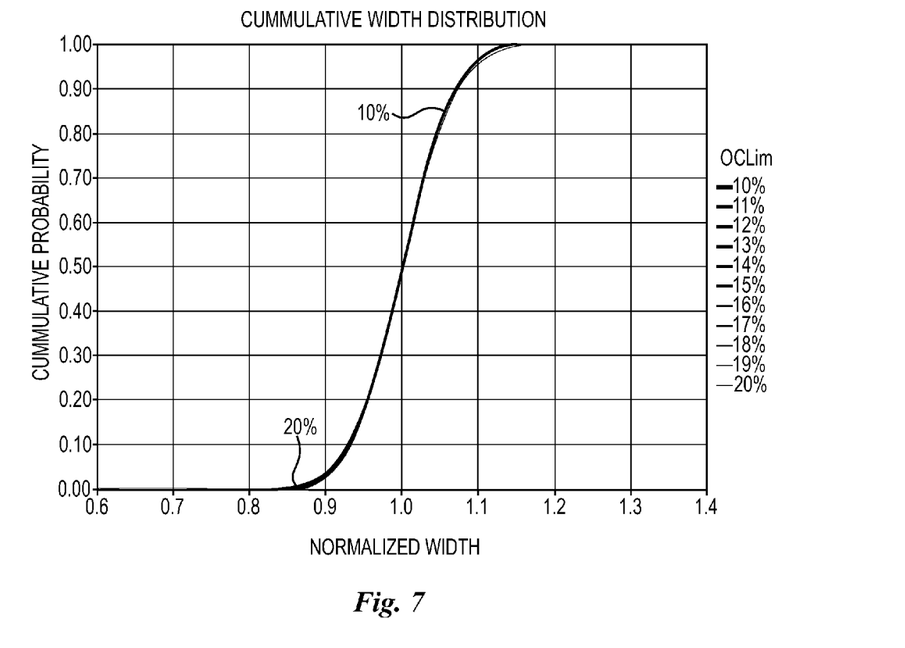
FIG. 7 shows the cumulative width distribution for values of a pitch limit, OCLim, from 10% to 20%.
Figure 8:
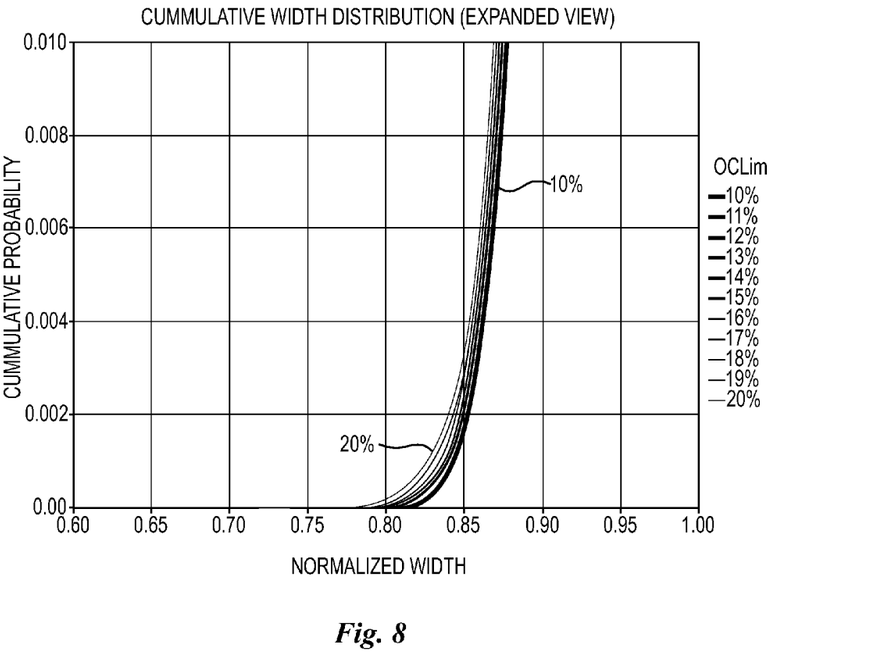
FIG. 8 shows the cumulative width distribution for values of OCLim on an expanded scale.
Figure 9:
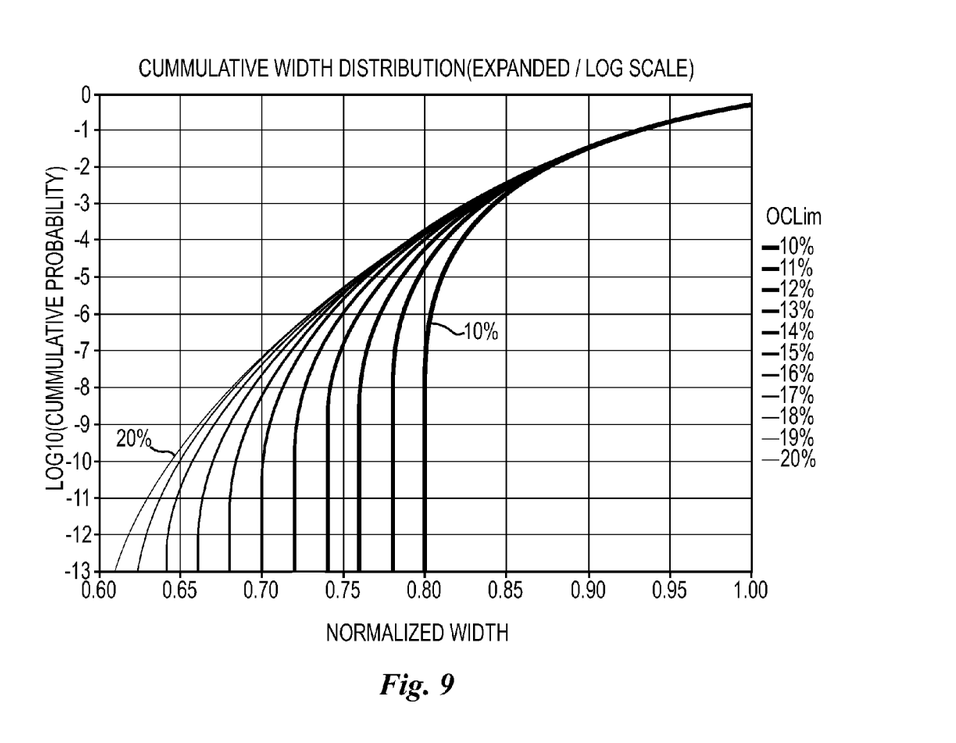
FIG. 9 shows the cumulative width distribution for values of OCLim on a log scale.

Approaches discussed in this disclosure include performing additional write operations if the effective width of a track is less than a threshold value. For example, the additional write operation may involve re-writing data previously written to a location that has a narrow effective width to another location on the storage medium. The additional write operation may involve writing additional redundancy information to the storage medium to supplement the error correction coding of the data written to the track with the narrow effective width. These approaches may be used as an alternative or in addition to terminating a write operation is the pitch is less than a limit value. The use of the pitch limit alone may not be sufficient to reduce the UER of the storage device to a desired level. Consider the example that the servo position error is a normal distribution with a standard deviation of 4% of the nominal track pitch. For purposes of explanation, it can be assumed that whenever the position error exceeds OCLim writing does not take place and the write position of the tracks on the storage medium can be approximated by a truncated normal distribution. A typical value of OCLim=16% would truncate the position distribution at 4 standard deviations. The effective width may be determined using the actual position information of two write events on adjacent tracks. FIG. 7 shows the cumulative width distribution for values of OCLim from 10% to 20% and on this scale there is little difference between the curves. Even with an expanded scale, shown in FIG. 8, the effect of OCLim is slight. FIG. 9 shows the same curves on a log scale. As would be expected, each curve has an asymptote corresponding to twice the value of OCLim, which is the worst case condition. But away from their respective asymptotes, all the curves have very similar shape.

Figure 10:
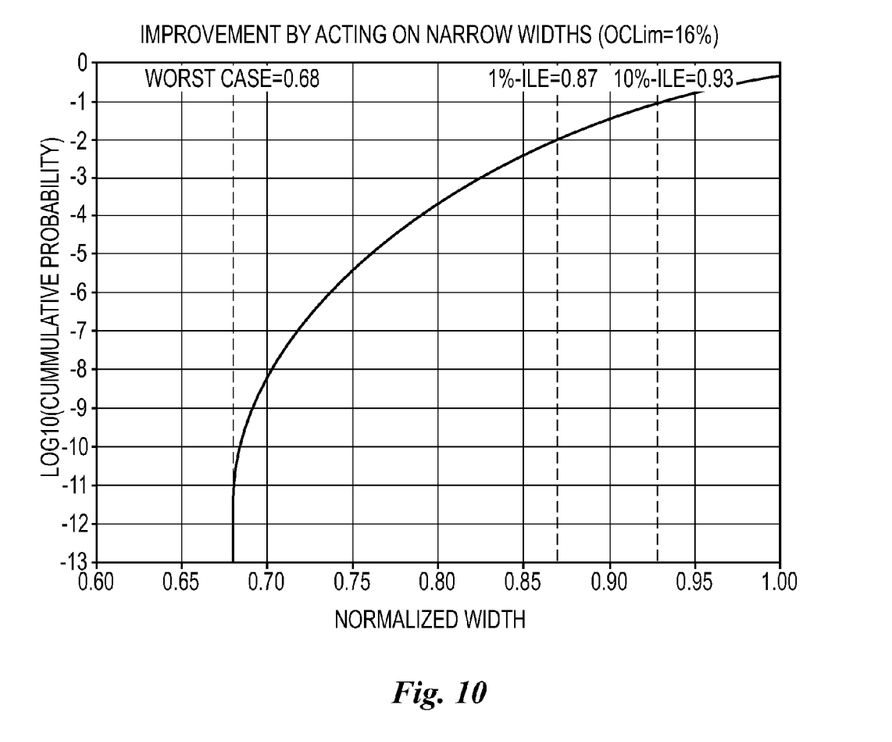
FIG. 10 illustrates the result of using of additional thresholds along with a pitch limit.

The benefit of the use of additional thresholds along with a pitch limit is illustrated in FIG. 10. If, for example, 1% of the blocks with the narrowest effective widths are re-directed, the minimum effective width can be increased from 0.68 to 0.87. Furthermore, if the remaining 9% of the blocks in the bottom tenth percentile are protected with additional redundancy overhead of 10% of a block the minimum written width can be increased to 0.93.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method of writing data to a recording medium, comprising:
   writing first track data to a first track on the recording medium;
   writing second track data to a second track on the recording medium wherein the second track overlaps the first track;
   determining an effective width of the first track, the effective width of the first track being a portion of the first track that is not overlapped by the second track; and
   performing one or more additional write operations to the recording medium to compensate for the effective width of the first track being less than a threshold, wherein the additional write operations include writing additional redundancy information to supplement coding of the first track data.

2. The method of claim 1, further comprising storing the first track data in cache until the one or more additional write operations are performed.

3. The method of claim 1, further comprising determining and storing an actual position of the first track after the first track data is written to the first track.

4. The method of claim 1, wherein the threshold is about 10% of a nominal track pitch.

5. The method of claim 1, wherein performing the one or more additional write operations further comprises storing the first track data and rewriting the first track data to a third track.

6. The method of claim 1, wherein:
   the threshold comprises a primary threshold and a secondary threshold; and
   performing the one or more additional write operations comprises:
      writing the additional redundancy information in response to the effective width of the first track being greater than the primary additional threshold and less than the secondary threshold.

7. The method of claim 6, wherein the primary threshold is set so that about 1% of data written to the recording medium is rewritten.

8. The method of claim 6, wherein the secondary threshold is set so that about 10% of data written to the recording medium has additional redundancy information.

9. The method of claim 1, wherein determining the effective width of the first track comprises:
   determining an actual write position of the first track using servo information;
   storing the actual write position of the first track; and
   calculating the effective width using the actual write position of the first track and a write position of the second track that is determined using the servo information.

10. The method of claim 1, wherein the recording medium comprises a shingled magnetic recording system.

11. A method of writing data to a recording medium, comprising:
    writing first track data to a first write track;
    adjusting a pitch limit used for writing second track data to a second track that overlaps the first track, the pitch limit specifying a maximum pitch variation between tracks of the recording medium.

12. The method of claim 11, further comprising after writing the first track data to the first track, determining an actual position of the first track on the recording medium, wherein adjusting the pitch limit comprises adjusting the pitch limit as a function of the actual position of the first track.

13. The method of claim 12, further comprising determining a position of the second track based on the actual position of the first track.

14. A storage device comprising:
    a control unit configured to cause multiple data tracks to be written to a recording medium, including a first track and a second track that overlaps the first track, the control unit configured to cause writing redundancy information related to the data previously written to the first track to a third track in response to an effective width of the first track being less than a threshold, the effective width being a portion of the first track that is not overlapped by the second track.

15. The storage device of claim 14, further comprising a cache, wherein the control unit is configured to determine an actual position of the first track based on servo information and to cause the actual position of the first write track to be stored in the cache.

16. The storage device of claim 14, wherein the predetermined threshold is about 10% of a nominal track pitch.

17. The storage device of claim 14, wherein the control unit is configured to determine an actual write position of the first track using servo information, to cause the actual write position of the first track to be stored in the cache, and to calculate the effective width using the stored actual write position of the first track and a write position of the second track that is determined using the servo information.

18. The storage device of claim 14, wherein the threshold includes a primary threshold and a secondary threshold, wherein the primary threshold is set so that about 1% of the data written to the recording medium is rewritten and the secondary threshold is set so that about 10% of the data written to the recording medium has additional redundancy information.

19. The storage device of claim 14, wherein the control unit is configured to determine a position of the second track based on an actual position of the first track.

* * * * *